US009489688B2

(12) United States Patent
Ning et al.

(10) Patent No.: US 9,489,688 B2
(45) Date of Patent: Nov. 8, 2016

(54) METHOD AND SYSTEM FOR RECOMMENDING SEARCH PHRASES

(71) Applicant: Alibaba Group Holding Limited, George Town (KY)

(72) Inventors: Wei Ning, Hangzhou (CN); Xiangyu Gu, Hangzhou (CN); Zhou Wang, Hangzhou (CN)

(73) Assignee: Alibaba Group Holding Limited (KY)

( * ) Notice: Subject to any disclaimer, the term of this patent is extended or adjusted under 35 U.S.C. 154(b) by 490 days.

(21) Appl. No.: 14/043,762

(22) Filed: Oct. 1, 2013

(65) Prior Publication Data

US 2014/0108200 A1   Apr. 17, 2014

(30) Foreign Application Priority Data

Oct. 12, 2012   (CN) .......................... 2012 1 0385554

(51) Int. Cl.
*G06F 17/00* (2006.01)
*G06Q 30/06* (2012.01)
*G06F 17/30* (2006.01)

(52) U.S. Cl.
CPC ....... *G06Q 30/0625* (2013.01); *G06F 17/3064* (2013.01); *G06F 17/3069* (2013.01); *G06F 17/30622* (2013.01); *G06F 17/30637* (2013.01); *G06F 17/30646* (2013.01); *G06F 17/30648* (2013.01); *G06Q 30/0603* (2013.01); *G06Q 30/0613* (2013.01)

(58) Field of Classification Search
CPC ..................... G06F 17/30867; G06F 17/3064; G06F 17/30864; G06F 17/30395; G06F 17/30554
See application file for complete search history.

(56) References Cited

U.S. PATENT DOCUMENTS 7,003,511 B1   2/2006 Antonov 7,266,551 B2   9/2007 Kravets
(Continued)

FOREIGN PATENT DOCUMENTS

CN   101820592   9/2010
CN   102012915   4/2011
(Continued)

OTHER PUBLICATIONS

Lertnattee et al. "Analysis of inverse class frequency in centroid-based text classification." Communications and Information Technology, 2004. ISCIT 2004. IEEE International Symposium on. vol. 2. IEEE, 2004.

*Primary Examiner* — Truong Vo
(74) *Attorney, Agent, or Firm* — Van Pelt, Yi & James LLP (57) ABSTRACT

Embodiments of the present application relate to a method for recommending search phrases, a system for recommending search phrases, and a computer program product for recommending search phrases. A method for recommending search phrases is provided. The method includes obtaining subject terms and descriptive terms relating to the subject terms from title information, combining s subject term with a descriptive term to form a set of search phrases, calculating a first appraisal value for each search phrase, the calculating of the first appraisal value comprising multiplying term frequency of the search phrase with an inverse document frequency of the search phrase, determining a second appraisal value of each search phrase, combining the first appraisal value and the second appraisal value of each search phrase to obtain a publisher recommendation appraisal value for each search phrase, and selecting a recommended phrase.

16 Claims, 7 Drawing Sheets

(56) References Cited

U.S. PATENT DOCUMENTS

| | | |
|---|---|---|
| 7,406,465 B2 | 7/2008 | Jones et al. |
| 7,716,219 B2 | 5/2010 | Sarukkai et al. |
| 8,688,690 B2 * | 4/2014 | Brdiczka .............. G06F 17/278 707/723 |
| 2004/0078214 A1 | 4/2004 | Speiser et al. |
| 2009/0171929 A1 | 7/2009 | Jing et al. |
| 2009/0216737 A1 * | 8/2009 | Dexter .............. G06F 17/30011 |
| 2010/0076979 A1 | 3/2010 | Wang et al. |

FOREIGN PATENT DOCUMENTS

| | | |
|---|---|---|
| CN | 102682001 | 9/2012 |
| WO | 2011014979 | 2/2011 |

* cited by examiner

METHOD AND SYSTEM FOR RECOMMENDING SEARCH PHRASES

CROSS REFERENCE TO OTHER APPLICATIONS

This application claims priority to People's Republic of China Patent Application No. 201210385554.9 entitled A METHOD AND SYSTEM FOR RECOMMENDING SEARCH PHRASES, filed Oct. 12, 2012 which is incorporated herein by reference for all purposes.

TECHNICAL FIELD

The present invention relates to a method and system for recommending search phrases.

BACKGROUND OF THE INVENTION

With the development of e-commerce websites, an increasing amount of merchandise transactions is moving from offline to online. E-commerce platforms provide sellers with information for publishing and display and the e-commerce platform provides buyers with information for reviewing and acquiring merchandise. The common e-commerce platforms typically provide buyers with search services for finding merchandise to be purchased. Typically, the e-commerce platforms also provide a search engine to serve as an information-acquiring tool for the buyers. For example, by searching for "mobile phones," users are able to view merchandise and merchants that are on the e-commerce platform. Among the found merchandise, the users identify merchandise to be purchased. Therefore, the platforms establish bridges for communication of information between the buyers and the sellers or, similarly, publishers and inquirers.

However, in some cases, because of a mismatch in buyer-seller information or asymmetries in fields of knowledge, the manner in which a seller expresses their information does not conform to the search habits of buyers. As a result, some users are unable to find a desired product, even though the product is accurately and reasonably exhibited for users desiring the products. Also, the seller loses out on a potential sale and the seller loses a target customer. Trying to make the buyer understand the ways in which the seller describes their products is unreasonable, or vice versa. In addition, when the seller, as a producer or provider of proxy services, introduce a new product or service, the buyer often lacks the relevant experience or knowledge to understand the description of the new product or service. As a result, the product or service cannot be reasonably and effectively described to the buyer, leading to added communication and connection costs between the buyer and the seller and to losses on both the buyer and the seller.

To reduce the losses, search engines typically reduce to the greatest extent possible the dissatisfaction caused by buyer-seller information mismatch by expanding user query terms. Therefore, a query term expansion technique is one means of reducing the buyer-seller information mismatch. However, the means that are currently employed to reduce buyer-seller information mismatches are typically from the buyer's viewpoint. Large volumes of buyer search logs from website platforms using query terms previously searched by users in these search logs are collected as data sets. Through clustering and other such methods, the user query terms are expanded. These user query terms are gathered from searches performed by other users who purchased similar products. This approach can, to a certain extent, reduce the one-sidedness of some buyer search phrases, and can increase information matching and user experience.

Some of the limitations with such a scheme include: the scheme is still one-sided although the scheme considers the behavior of a certain volume of buyers and reduces some of the one-sidedness of searching by some users; information expansion falls short, in terms of both richness and satisfaction; becoming aware of the appearance of new search phrases is very difficult because the scheme relies solely on buyer information, i.e., the terms used in searches by specific customer groups at a website; information mismatching problems exist; and websites typically use user search phrase statistics and then form expanded term recommendation lists based on clustering correlations and other such means. However, the websites still often find presenting good recommendation results, in the case of new merchandise or of merchandise that has gained sudden popularity, to be difficult. In addition, the websites are usually unable to reduce buyer-seller information mismatches. Where asymmetries of professional knowledge exist, the descriptive methods of sellers sometimes do not match buyers. As a consequence, some seller information and merchandise fail to be well exhibited within searches, and the asymmetries of professional knowledge adversely affect the experiences and benefits of website users, both buyers and sellers. The situation for publishers and inquirers is also similar.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
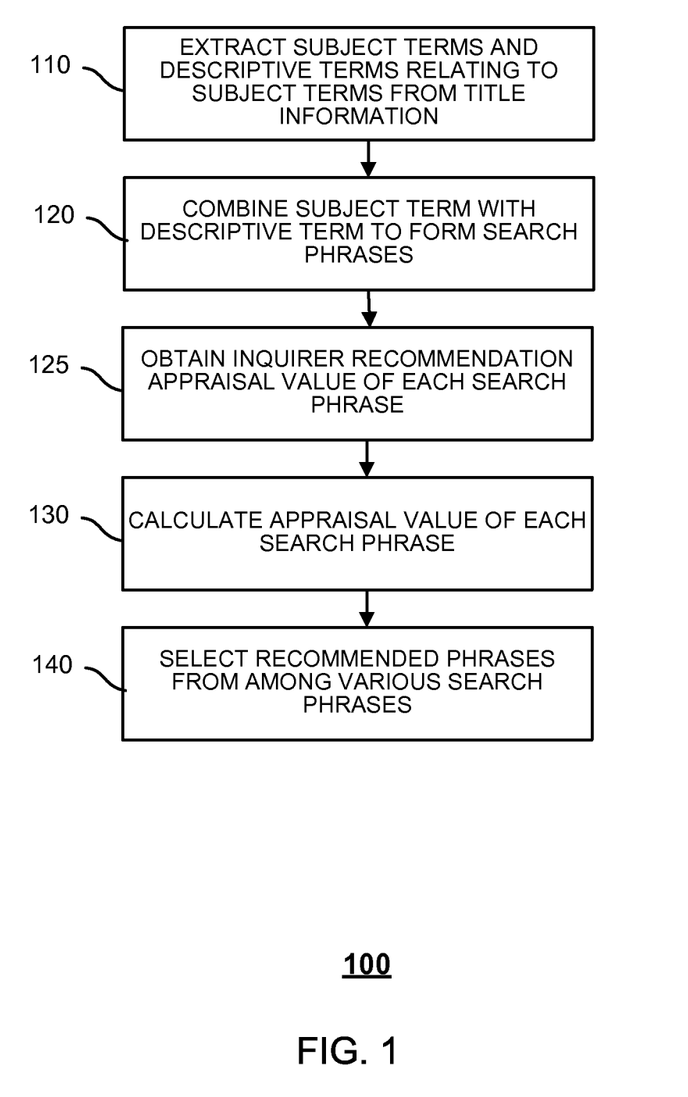
FIG. 1 is a flowchart illustrating an embodiment of a method for recommending search phrases.

FIG. 1 is a flowchart illustrating an embodiment of a method for recommending search phrases. In some embodiments, the method 100 is implemented by a server such as server 730 of FIG. 7 and comprises:

In 110, the server extracts subject terms and descriptive terms relating to the subject terms from title information of information published by publishers.

The subject terms relate to subjects of the title information and represent key content of the title information. For example, the subject terms are product terms, nouns that represent specific things, etc. For example, the title information of a product corresponds to "2013 fall collection of new designer shirt V neck stylish leisure long sleeve pure cotton dress shirt," and "shirt" and "dress shirt" correspond to the nouns that represent specific things.

The descriptive terms are words used to limit, describe, and modify the subject terms. In some embodiments, the descriptive terms include attribute terms and modifiers. In some embodiments, the attribute terms are used to describe attributes, for example, material or brand, belonging to a subject term itself. Other examples of attribute terms include words describing product material, for example, cotton, metal, etc., words indicating brands, for example, NIKE, Nokia, iPhone, etc., and words indicating the color of the product, for example, yellow, blue, etc.

In some embodiments, the modifiers are used to modify the subject terms. In some embodiments, the modifiers are descriptions of subject term external evaluations. Examples of the modifiers include "useful" and "popular." In some embodiments, the modifiers are adjectives which describe certain characteristics of merchandise, such as "sturdy," "sexy," or "fashionable."

In some embodiments, the extracting of the subject terms and the descriptive terms is conventionally performed according to relevant content. For example, a subject term library or set is established during extraction of the subject terms. The subject term library is searched for title information. In the event that words in the title information that match words in the subject term library or set, the matched words are extracted as subject terms. The extraction of the descriptive terms from the subject term library or set is performed similarly to that of the subject terms.

In 120, the server combines the subject terms with a descriptive term to form search phrases. In other words, the search phrases are formed by combining the subject terms with the various descriptive terms or the various combinations and permutations of the descriptive terms.

For example, a subject term is "computer" and the corresponding descriptive terms are based on at least in part "high-performance" and "latest model." In the event that the subject term is combined with only one descriptive term, the resulting search phrases are "high-performance, computer" and "latest model, computer." In the event that the subject term is combined with more than one descriptive term, the resulting search phrases are: "high-performance, latest model computer" and "latest model, high-performance computer." In some embodiments, each subject term serves as a search phrase. For example, "computer" in the above example also serves as a search phrase.

The following are examples of the descriptive term A and the subject term B being combined into the search phrase C:

"A B" or "A, B," for example, is combined into "latest model computer" or "latest model, computer."

"B of A," for example, is combined into "computer of latest model;"

"B, A" or "B A," for example, is combined into "computer, latest model" or "computer latest model."

In some embodiments, the various phrases formed by combining the descriptive term A and the subject term B is regarded as the same search phrase. For example, "latest model, computer" and "computer, latest model" are both search phrases obtained through combining "latest model" and "computer."

In some embodiments, when a search phrase contains a plurality of descriptive terms, for example, descriptive term A1 and descriptive term A2, the combinations of descriptive term A1, descriptive term A2, and subject term B also reference the above examples. In some embodiments, the different combinations of descriptive term A1, descriptive term A2, and subject term B are regarded as different search phrases. For example, "high-performance, latest model, computer" and "latest model, high-performance, computer" are regarded as two different search phrases.

When a search phrase serves as a recommended phrase, any of the above forms is permitted. For example, regarding the search phrase "quad-core, computer," when a recommended phrase is presented to the inquirer, "quad-core computer," "computer, quad-core," and all other such forms can appear as the recommended phrase.

In 130, the server calculates an appraisal value of each formed search phrase. In some embodiments, the appraisal value is based at least in part on a first appraisal value and a second appraisal value. For example, the appraisal value is determined by combining a first appraisal value and a second appraisal value in some embodiments. A term frequency (TF) of the search phrase is multiplied by an inverse document frequency (IDF) of the search phrase to obtain the first appraisal value for each search phrase. Calculation of an inverse class frequency (ICF) of each search phrase in a designated class is performed to obtain the second appraisal value of each search term. Designated classes are delineated in advance according to subject categories of the subject terms. Examples of the subject categories include "machinery" and "apparel." The designated classes also relate to product categories. For example, if the titles of products include shirt, dress shirt, etc., which are product names, then the product names are the designated words of the titles, and the corresponding designated classes of shirt and dress shirt are the product categories of shirt and dress shirt. The designated words of the titles belong to a clothing class. Thus, the designated class is "clothing." In some embodiments, no restrictions on the order in which the various appraisal values are calculated exist. The appraisal value of each search phrase is weighted, and the appraisal values are added together to obtain a publisher recommendation appraisal value for each search phrase.

In some embodiments, the term frequency (TF) of the search phrase corresponds to the number of times that the search phrase appears in all published information (including title information and the main text) on websites or platforms. In some embodiments, the term frequency for the search phrase corresponds to the frequency of descriptive terms associated with subject terms contained within the search phrases, i.e., the frequency of the descriptive terms, that is used to describe the subject terms in the search phrases in all published information on the websites or platforms.

In some embodiments, in cases of a plurality of descriptive terms, for example, when a search phrase is formed by combining descriptive term A1, descriptive term A2, and subject term B, each combination of the search phrases A1B, A2, and A1 AB is regarded as having appeared once when "A1 AB" appears as the search phrase.

The inverse document frequency (IDF) of a search phrase corresponds to a measure of the general importance of a term. In some embodiments, the IDF of a search phrase is obtained by dividing the total quantity of published information on the websites or platforms by the amount of published information containing the search phrase and calculating the logarithm of the resulting quotient. "Published information containing the search phrase" refers to published information which contains the subject term and descriptive terms of the search phrase, where the descriptive terms are used to describe the subject term.

The inverse class frequency (ICF) corresponds to a measure for evaluating phrase importance according to a class dimension. The ICF refers to a frequency a word appears in a particular class dimension. For example, after measuring the appearance frequency of a particular word in all the product pages in a clothing class, the frequency is used to determine the ICF. The class frequency (CF) of a search phrase corresponds to the number of appearances of the search phrase in a specific class. When computing the CF of a particular word in the clothing class, the clothing class is the specific class. Examples of classes include clothing, electronics, food, home decorating, books, etc. In some embodiments, the ICF of a search phrase in a designated class is obtained by dividing the total quantity of published information in the designated class (PIcl) by the amount of published information containing the search phrase (PIsp) and then calculating the logarithm of the resulting quotient. In some embodiments, the PIsp corresponds to the total number of times the word appears in the category. In some embodiments, the quantity of published information corresponds to the total number of product pages published by all the sellers of an ecommerce website. In some embodiments, the amount of published information containing the search phrase corresponds to a number of product pages that include the search phrase.

$$ICF=\log(PIcl/PIsp)$$

In some embodiments, in the event that, while published information (e.g., phrases) containing the search phrase is being counted, any updates to the published information is accounted for. For example, if the search phrase appears twice in one piece of published information, 2 is added to the amount of published information containing the search phrase; if the search phrase appears three times in one piece of published information, 3 is added to the amount of published information containing the search phrase, etc. In some embodiments, the "appearances of the search phrase in a specific class" is understood as the number of appearances of the subject term and the descriptive terms of the search phrase in a specific class, the descriptive terms being used to describe the subject term.

In 140, the server selects recommended phrases among the various search phrases based on the publisher recommendation appraisal values. In some embodiments, the server obtains recommended phrases by ranking or filtering the search phrases according to the publisher recommendation appraisal values.

In some embodiments, the search phrases are ranked according to the publisher recommendation appraisal values in high to low order, with a predetermined quantity of the top-ranked search phrases serving as the obtained recommended phrases.

In some embodiments, the search phrases are filtered by comparing the publisher recommendation appraisal values with a preset threshold value. The search phrases having a publisher recommendation value is greater than or equal to a predetermined threshold value serve as the recommended phrases.

In the event that an inquirer enters part of the content that is to be searched for by directly keying the part of the content into a search box or by selecting the part of the content among given items, the server acquires a plurality of search phrases associated with entered subject terms based on the content entered by the inquirer. In some embodiments, the associated search phrases are search phrases containing the subject terms associated with the content entered by the inquirer. Recommended phrases are selected among a plurality of the associated search phrases, which are presented to the inquirer through a pull-down menu or other appropriate means. For example, in the event that the content entered by the inquirer is simply one subject term, recommended phrases are selected among the search phrases containing the subject term in the above manner. In some embodiments, the recommended phrases are selected by ranking or filtering the plurality of the associated search phrases according to publisher recommendation appraisal values and pushing the results of the ranking or filtering as the recommended phrases to the inquirer.

In another example, in the event that the content entered by the inquirer is the title of a class (for example, apparel), recommended phrases are selected in the above manner among all of the search phrases containing the subject terms (such as dresses, pants, jackets, shirts, etc.) in that class. In yet another example, in the event that the content entered by the inquirer is a name of a product or a search word (such as mobile terminal), recommended phrases are selected in the manner described above among all search phrases containing subject terms (such as mobile phones, tablets, notebook computers, POS devices, etc.) relating to the product.

In some embodiments, the method 100 further comprises:

In 125, for each search phrase, the server obtains an inquirer recommendation appraisal value. The obtaining of the inquirer recommendation appraisal value of each search phrase includes obtaining the number of times that the inquirer used the search phrase (i.e., page views), the number of results obtained when using the search phrase, the number of times that the inquirer clicked the obtained results, or any combination thereof. For example, the number of times that the inquirer used the search phrase, the number of results obtained when using the search phrase, the number of times that the inquirer clicked the obtained results, or any combination thereof are weighted and added together to obtain the inquirer recommendation appraisal value for each search phrase.

In some embodiments, the number of times that the inquirer used the search phrase (i.e., page views), the number of results obtained when using the search phrase, the number of times that the inquirer clicked the obtained results, or any combination thereof is obtained from user historical search records.

Although operation 125 is performed before operation 130, no restrictions on the order in which the inquirer recommendation appraisal values and the publisher recommendation appraisal values are acquired exist. In other words, in some embodiments, operation 125 is performed after operation 130.

In some embodiments, some of the search phrases among the search phrases obtained in 120 are used in the event that the inquirer performs information searches. In other words, some of the search phrases are stored in the user historical search records. In this example, the search phrases are only used by the publishers and only appear in the published information, and the search phrases have not been used by searchers. Thus, the search phrases do not exist in the search logs of the searchers. In such a situation, no need exists to give recommendation appraisal values for the search phrases.

Figure 2:
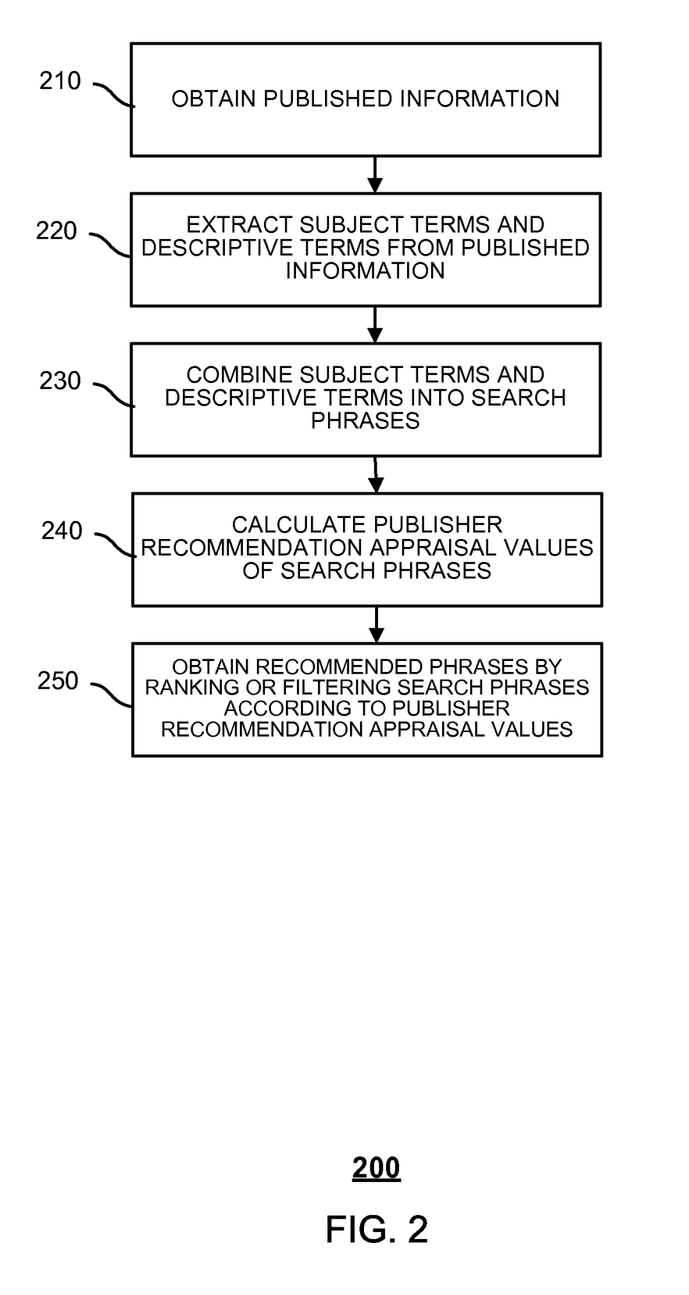
FIG. 2 is a diagram illustrating another embodiment of a method for recommending search phrases.

FIG. 2 is a diagram illustrating another embodiment of a method for recommending search phrases. In some embodiments, the method 200 is implemented by a server similar to server 730 of FIG. 7 and comprises:

The embodiment of FIG. 2 is similar is substance to the embodiment of FIG. 1. FIG. 2 illustrates a different way of expressing FIG. 1.

In 210, the server obtains published information.

In 220, the server extracts subject terms and descriptive terms from the published information.

In 230, the server combines the subject terms and the descriptive terms into search phrases.

In 240, the server calculates publisher recommendation appraisal values of the search phrases.

In 250, the server obtains recommended phrases by ranking or filtering the search phrases according to the publisher recommendation appraisal values.

Figure 3:
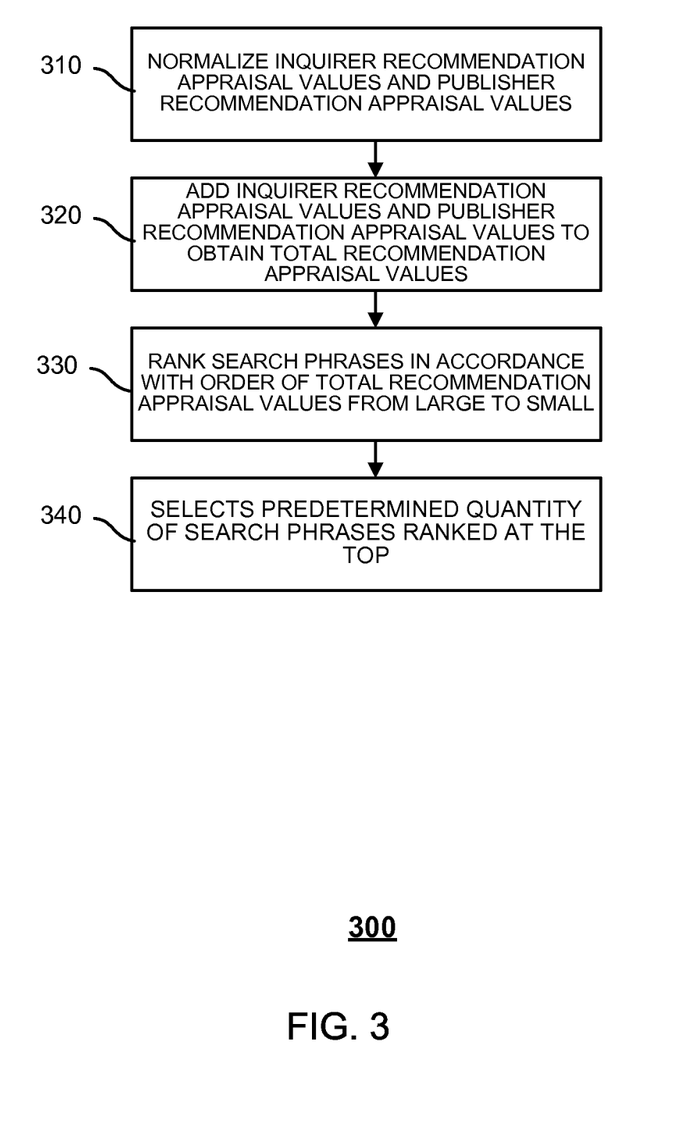
FIG. 3 is a diagram illustrating an embodiment of a method for recommending search phrases.

FIG. 3 is a flowchart illustrating an embodiment of a method for selecting recommended phrases among search phrases. In some embodiments, the method 300 is an implementation of 140 of FIG. 1 and comprises:

In 310, the server normalizes the inquirer recommendation appraisal values and the publisher recommendation appraisal values. In some embodiments, the inquirer recommendation appraisal values and the publisher recommendation appraisal values are normalized according to the same scale to permit comparisons of the inquirer/publisher recommendation appraisal values of search phrases that are used only by inquirer/publisher information.

In 320, the server adds the normalized inquirer recommendation appraisal values and the normalized publisher recommendation appraisal values of all the search phrases to obtain total recommendation appraisal values.

In 330, the server ranks the search phrases in accordance with the order of total recommendation appraisal values from large to small.

In 340, the server selects a predetermined quantity of search phrases ranked at the top to serve as recommended phrases or search phrases with recommendation appraisal values greater than or equal to a predetermined threshold value as recommended phrases.

In some embodiments, no restrictions exist as to the order in which the inquirer recommendation appraisal values and the publisher recommendation appraisal values are calculated, and in some embodiments, the recommended phrases are obtained solely based on high-to-low rankings of publisher recommendation appraisal values.

In some embodiments, the inquirer recommendation appraisal values are obtained based on an analysis of historical search and click actions of inquirers, and the publisher recommendation appraisal values are obtained from descriptive information filled in by publishers. The inquirer and publisher recommendation appraisal values are normalized, added together, and ranked. The inquirer and publisher recommendation appraisal values are then merged, selected, and assessed as final-output recommended phrase information. In this scenario, the appropriate recommended phrases are determined based on different search phrases. This scenario increases inquirer search efficiency, enhances user experience, and provides a reasonable exposure of publisher information.

In some embodiments, the appraisal values are based at least in part on third appraisal values. Prior to combining (e.g. weighting and summing) each appraisal value of each search phrase, the server calculate a fluency score of each search phrase based on a binary language model to obtain a third appraisal value for each search phrase.

In some embodiments, a binary language model (N-gram) is used. As used herein, Ngram refers to a technique for calculating the probability of a sentence or phrase appearing in all published information on websites or platforms. In some embodiments, a multi-element language model is used, for example, a bi-gram or a tri-gram. By calculating the probability of a first term appearing in a sentence or a phrase and the probability of the front term jointly appearing with each subsequent term when the subsequent terms appear, the technique estimates the probability that an entire sentence or phrase composed of a string of words will appear. In some embodiments, the technique is used to determine whether the constructed search phrases conform to conventional wording. For example, "steel dress" is a phrase that is very unlikely to appear, so the probability of the appearance of the phrase is very low, which indicates that this phrase is unconventional. In some embodiments, the binary language model calculates third appraisal values, but the binary language model is not limited to this role. In other words, the binary language model multiplies the probability that the first term in the search phrase will appear in all the published information with the probability that the first term will appear in all the published information when the second term in the search phrase appears to obtain a third appraisal value for each search phrase. In the event that, when the binary language model is used to calculate the third appraisal values, a search phrase includes one descriptive term and one subject term, the first term is the descriptive term, and the second term is the subject term. In the event that the search phrase includes two descriptive terms, the two descriptive terms that are placed in the front are regarded in the order that they are placed as the first term and the second term in the search phrase when calculating the third appraisal value. For example, in the search phrase "high-performance, latest model, computer" in the above example, the first term is "high-performance" and the second term is "latest model." Yet, in the search phrase "latest model, high-performance, computer," the first term is "latest model," and the second term is "high-performance."

In some embodiments, the appraisal values are based at least in part on fourth appraisal values. Before the weighting and summing of each appraisal value of each search phrase, the server calculates a variation of quantity or frequency of each search phrase within a time interval to obtain a fourth appraisal value for each search phrase. The variation of the quantity or the frequency of a search phrase within a time interval is obtained by dividing the difference between the maximum and minimum values of the search phrase quantity or frequency within the time interval in all published information on websites and platforms by a length of the time interval. In some embodiments, the quantity or the frequency of the search phrase appearances is acquired through real-time monitoring or periodical monitoring.

In some embodiments, the appraisal values are based at least in part on fifth appraisal values. Before the weighting and summing of each appraisal value of each search phrase, the server obtains fifth appraisal values of search phrases containing the subject terms based on the quality of the merchandise represented by the subject terms, the fifth appraisal values having a higher value indicating a better quality of the merchandise than quality of a merchandise having a lower value. In some embodiments, the quality of the merchandise is determined based onsales volume or sales price of a product. Thus, the publisher recommendation appraisal values of higher quality merchandise are increased in comparison to the publisher recommendation appraisal values of lower quality merchandise.

In some embodiments, the appraisal values are based at least in part on sixth appraisal values. Before the weighting and summing of each appraisal value of each search phrase, the server sets sixth appraisal values of search phrases whose subject term relates to new merchandise higher than sixth appraisal values of search phrases whose subject term is not new merchandise. In some embodiments, the sixth appraisal value is determined based in part on the time at which the merchandise is added by the seller, such that a merchandise that is more recently added receives a higher sixth appraisal value than a merchandise that was added earlier. Thus, the publisher recommendation appraisal values of new merchandise are increased in comparison to the publisher recommendation appraisal values of merchandise that is not new.

No restriction exists as to the order in which each appraisal value is calculated. In some embodiments, the appraisal values are calculated in parallel.

In some embodiments, while the publisher recommendation appraisal values are being calculated, the newly added third appraisal values, fourth appraisal values, fifth appraisal values, sixth appraisal values, or any combination thereof is thereupon selectively weighted and added to the first and second appraisal values to obtain the publisher recommendation appraisal values.

In some embodiments, other appraisal values are, as desired, weighted and added to the first and second appraisal values to obtain the publisher recommendation appraisal values.

Figure 4:
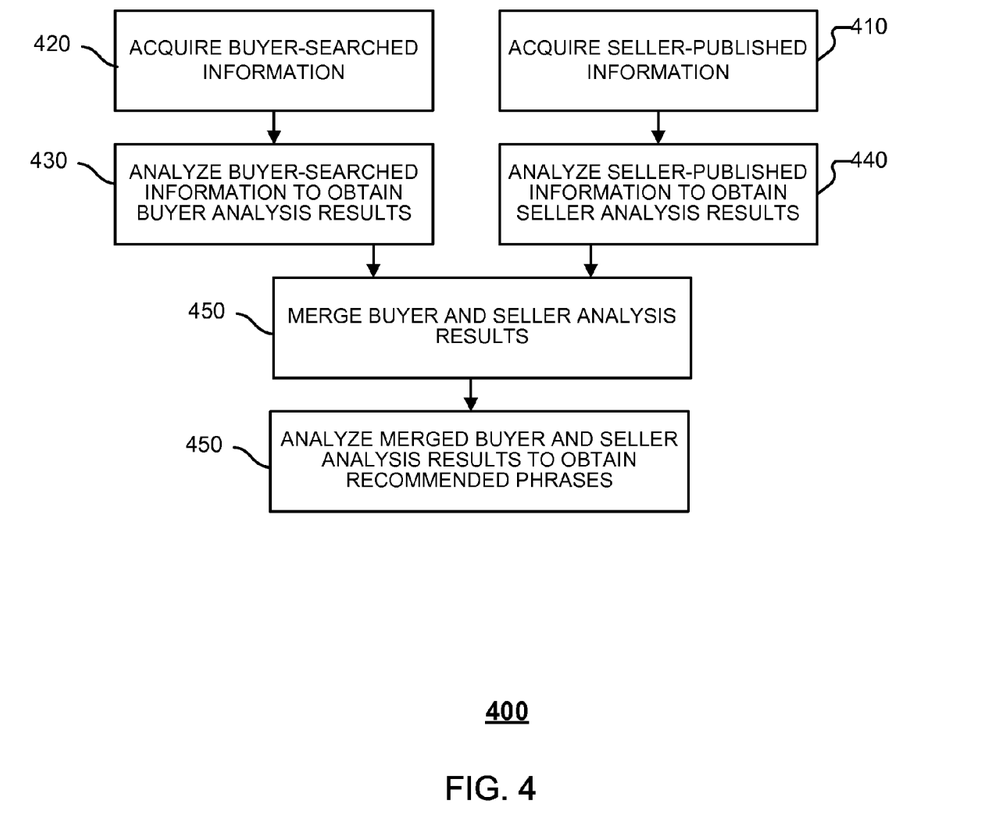
FIG. 4 is a flowchart illustrating an embodiment of a method for selecting recommended phrases among search phrases.

An explanation is provided below through an optional scheme where buyers are the inquirers, sellers are the publishers, and merchandise titles are the subject terms. FIG. 4 is a flowchart illustrating an embodiment of a method for selecting recommended phrases among search phrases. In some embodiments, the method 400 is implemented by the server 730 of FIG. 7 and comprises:

In 410, the server acquires seller-published information.

In 420, the server acquires buyer-searched information.

In 430, the server analyzes the buyer-searched information to obtain buyer analysis results. In some embodiments, the buyer analysis results include a buyer's past search word and appraisal value for each search word, and the appraisal value for each search word is determined based on the click through rate, product purchase rate, and other values.

In 440, the server analyzes the seller-published information to obtain seller analysis results. In some embodiments, the seller analysis results include a search phrase from a publisher's published information and recommendation appraisal value of the search phrase.

In 450, the server merges the buyer and the seller analysis results.

In 460, the server analyzes the merged buyer and seller analysis results to obtain recommended phrases for the buyer.

Figure 5:
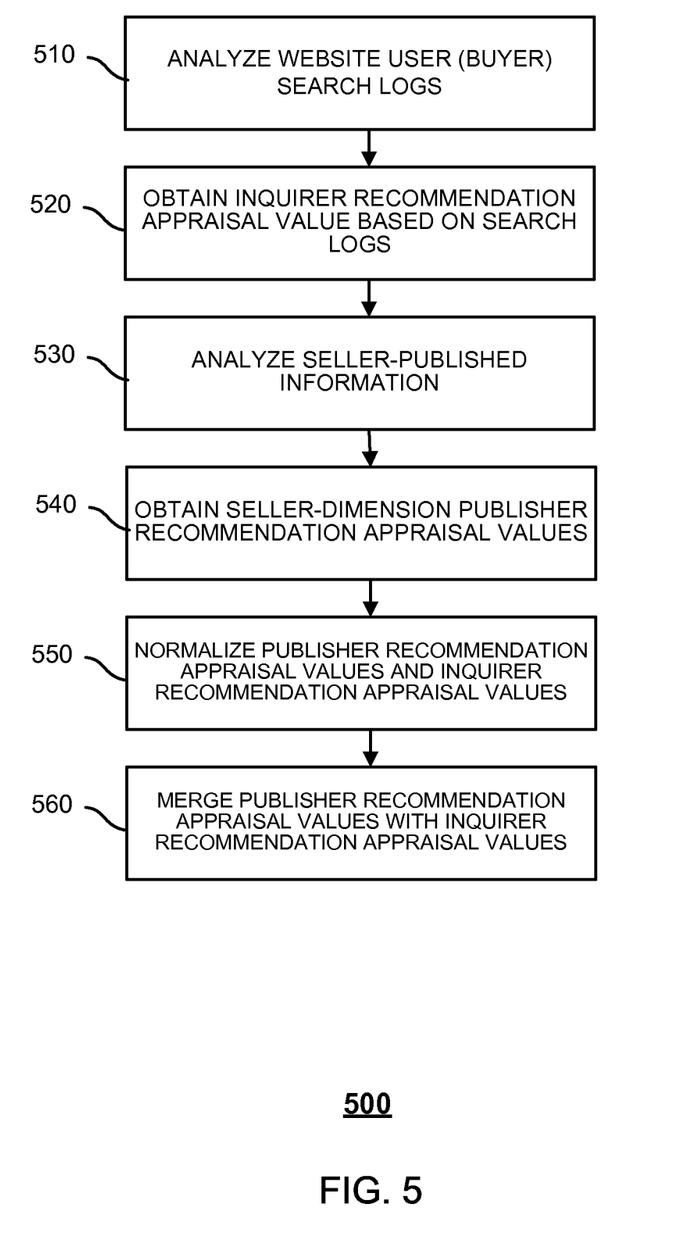
FIG. 5 is a processing flowchart illustrating an example of a method for recommending search phrases.

FIG. 5 is a diagram illustrating an example of a method for recommending search phrases. In some embodiments, the method 500 is implemented by the server 730 of FIG. 7 and comprises:

In 510, the server analyzes website users' (specifically buyers') search logs. In some embodiments, the search logs include the following characteristic information: keywords used by users, search page views (PV), clicking information, number of results, and other characteristic information. The keywords used by the users are regarded as search phrases from viewpoint information of inquirers. In some embodiments, scores are computed for each search phrase using the characteristic information. For example, the values of the characteristic information for each search phrase are normalized and summed to compute a corresponding score. Other computation methods can be used.

In 520, the server obtains an inquirer recommendation appraisal value based on the search logs. In some embodiments, the inquirer recommendation appraisal value is obtained using the score of each search phrase. The obtaining operation relates to using buyer group search results to make recommendations.

In 530, the server analyzes seller-published information. When sellers publish information at a website, the sellers generally describe the characteristics of their own merchandise in detail. As an example, when describing some merchandise of a more professional nature, the seller, having a relatively more professional background regarding their merchandise than a buyer, tends to employ descriptions geared to professionals. As an aspect, the buyer, due to asymmetries in the buyer's knowledge of the merchandise, may not use a corresponding professional description when searching for the relevant merchandise, and therefore is unable to find a suitable product. Thus, the descriptive information used by the seller is to be analyzed in detail through the following process:

First, title information of the seller-published information is subject to extraction and analysis in order to obtain the subject term (i.e., the merchandise term in this example) of a piece of information and other related descriptive terms used to describe the nature and condition of the merchandise. By analyzing the information published by the sellers on a website, the server obtains all merchandise terms and the descriptive terms corresponding the merchandise terms.

The various descriptive terms corresponding to each merchandise term and their various combinations and permutations are connected with the respective merchandise terms to form phrases. The phrases, including the various merchandise terms themselves, serve as search phrases corresponding to the various merchandise terms. The phrases are search phrases obtained from the point of view of the information publisher.

Then, the server multiplies the TF of each search phrase by the IDF of each search phrase to calculate a score that indicates the importance of each search phrase that has been obtained, and the calculated importance score serves as the first appraisal value, denoted as Score1. In addition, class information is used to conduct appraisals. By analyzing class information corresponding to merchandise terms, and using class as a "key," the importance of search phrases within the class is determined. The mode of appraisal is ICF, and the server obtains second appraisal values, denoted as Score2. At the same time, to ensure the fluency of character combinations, a language model is introduced to conduct fluency assessments. For example, the language model computation formula for a phrase or sentence having n (positive integer) words is:

$$P(S)=P(word1)P(word2|word1)P(word3|word1\ word2)......P[wordn|word1\ word2......word(n-1)]$$

where P (word1) is the probability of a first word occurring in a phrase or sentence, P (word2|word1) is the probability of a second word occurring in a phrase or sentence when a first word has occurred there, etc. If consideration is given to calculation volume, a binary language model for scoring and appraising is used to obtain the search object fluency score P(S), which is the third appraisal value, denoted as Score 3.

In 540, based on the above analysis, the process obtains seller-dimension publisher recommendation appraisal values that were calculated from information published by the publishers. In some embodiments, the final publisher recommendation appraisal value score is:

$$Score=w1*Score1+w2*Score2+w3*Score3.$$

In some embodiments, when analyzing seller information, the process also weights recommended phrases according to how "hot" the phrases are and time factors. In some embodiments, superior-quality products whose supply has obviously increased in the most recent time interval are weighed. As an example, a variation of the quantity or frequency of each search phrase within a time interval is calculated to obtain the fourth appraisal value, Score4, for each search phrase. In some embodiments, the variation of the quantity or the frequency of the search phrase within a time interval is obtained by dividing the difference between the maximum and minimum values of the search phrase quantity or frequency in the time interval by a length of the time interval. At this point, the final publisher recommendation appraisal value score is:

$$Score=w1\times Score1+w2\times Score2+w3\times Score3+w4\times Score4$$

where w1, w2, w3 and w4 are weighting values. In some embodiments, the weighting values are set and modified according to empirical values or actual need to adjust the proportions of different appraisal values in the final publisher recommendation appraisal values. For example, if the scores are deemed to be equally important, the weights would be set to be the same; if Score1 is deemed to have a higher importance than the other scores, w1 would be set to a higher value, In addition, increasing the publisher recommendation appraisal values of search phrases whose subject term is related to high-quality merchandise or new merchandise is also possible.

In 550, the server normalizes the publisher recommendation appraisal values and the inquirer recommendation appraisal values (both the publisher recommendation appraisal values and the respective inquirer recommendation appraisal values were obtained based on the operations described above).

In 560, the server merges the publisher recommendation appraisal values with the respective inquirer recommendation appraisal values by adding the normalized publisher recommendation appraisal values and the normalized inquirer recommendation appraisal values to produce the final recommendation appraisal values. The server regards search phrases whose recommendation appraisal values are greater than or equal to a recommendation threshold value as recommended phrases or ranks the search phrases in order of large to small recommendation appraisal values, and regards a predetermined quantity of top-ranked search phrases as recommended phrases to obtain the final recommended phrases.

The embodiments and the optional scheme described above can be applied to, but are not limited to, website recommendations, search engines, and other such services (for example, most popular search lists and search fields on e-commerce websites). Because the search phrases are issued from the point of view of publishers, the search phrases are acquired from the various pieces of published information on websites or platforms, and the determining of which search phrases within the published information are used more often and thereby used for making recommendations is based on frequencies (including TF, ICF and IDF) with which search phrases appear in all published information on websites or platforms.

Because recommendations are not derived simply from the point of view of the information inquirer, search phrases that are not customarily used by information inquirers but that are more suited to publisher habits are recommended. As an example, in the case of more professional search phrases, or with regard to some new products, information inquirers might not have sufficient knowledge to make a determination or may not be aware of the kind of words that might be used to conduct a search. In the event that only matter from the viewpoint of the inquirers is considered, search phrases not used by inquirers are not to be recommended. As an aspect, in the event that recommendations are geared towards publishers, wording which is more professional or wording that relates to new products may serve as search phrases recommended to the inquirer. In this way, the quantity of inquirer search phrases can be expanded, causing search phrases to conform to published information and helping inquirers to search for desired information in situations where their professional knowledge is insufficient. This approach can also enable the inquirers to learn of new products in a more comprehensive manner, and the approach can allow the best possible matches between the words used by the publishers and the words used by the inquirers.

For example, in the event that a user wishes to purchase an umbrella on an e-commerce website, but the user does not know that a new product, the "super-large umbrella," exists and the user would not use the search phrase, "super-large umbrella." In the event that many merchants introduce the "super-large umbrella" in quick succession within a period of time, the publisher recommendation appraisal value for "super-large umbrella" will be higher because of the existence of a greater quantity of published information containing "super-large umbrella" during this time period. The search phrase, "super-large umbrella," will be recommended to users even if the "super-large umbrella" has not been searched by any user. In this way, users are able to learn of this new product.

Since information publishers continually publish updated information and may delete past information, the status of the published information is continually changing. Therefore, the publisher recommendation appraisal values are also undergoing changes, and the publisher recommendation appraisal values affect the recommended phrases that are ultimately selected. The method of periodically executing the embodiments and the optional scheme described above continually updates recommended phrases, bringing the recommended phrases in line with the latest information trends.

Figure 6:
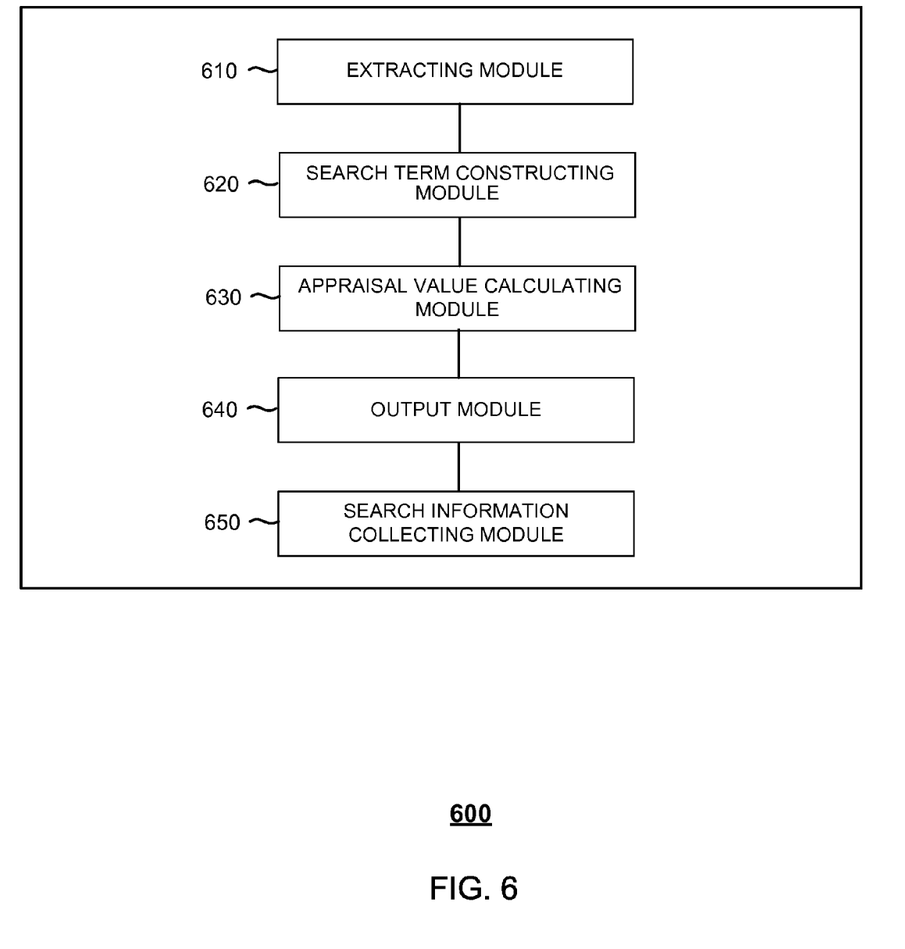
FIG. 6 is a structural diagram illustrating an embodiment of a device for recommending search phrases.

FIG. 6 is a structural diagram illustrating an embodiment of a device for recommending search phrases. In some embodiments, the device 600 comprises an extracting module 610, a search term constructing module 620, an appraisal value calculating module 630, and an output module 640.

The extracting module 610 extracts from title information of information published by publishers to obtain one or more subject terms and one or more descriptive terms used to limit the one or more subject terms.

The search term constructing module 620 combines one or more subject terms with one or more descriptive terms to obtain search phrases.

The appraisal value calculating module 630 calculates an appraisal value of each obtained search phrase. In some embodiments, the appraisal values are based at least in part on a first appraisal value and a second appraisal value. In some embodiments, the appraisal value calculating module 630 calculates the first appraisal value for each search phrase by multiplying the term frequency of the search phrases with the inverse document frequency of the search phrases. In some embodiments, the appraisal value calculating module 630 calculates the inverse class frequency of each search phrase within the designated class and regards the inverse class frequency of each search phrase as a second appraisal value. In some embodiments, the appraisal value calculating module 630 weights and adds together each appraisal value of each search phrase to obtain a publisher recommendation appraisal value for each search phrase.

The output module 640 ranks the search phrases according to the publisher recommendation appraisal values and obtains recommended phrases based on the ranked search phrases.

In some embodiments, the device further comprises a search information collecting module 650.

The search information collecting module 650 acquires the search phrases used by inquirers, and weights and adds together the number of times that the inquirers have used each of the search phrases that were acquired, the number of results obtained when the search phrases were used, and the number of times that the inquirers clicked the obtained search results to obtain a inquirer recommendation appraisal value for each search phrase.

In some embodiments, the output module 640 selects recommended phrases among the search phrases based on the publisher recommendation appraisal values.

In some embodiments, the output module 640 normalizing the inquirer recommendation appraisal values and publisher recommendation appraisal values of all the search phrases, adds the normalized inquirer recommendation appraisal values and the normalized publisher recommendation appraisal values of all the search phrases to obtain total recommendation appraisal values, ranks the search phrases in accordance with the order of total recommendation appraisal values from large to small, and selects a predetermined quantity of search phrases ranked at the top to serve as recommended phrases or regards search phrases with recommendation appraisal values greater than or equal to a predetermined threshold value as recommended phrases.

No restrictions exist on the order in which the inquirer recommendation appraisal values and the publisher recommendation appraisal values are calculated by the output module 640, and in some embodiments, recommended phrases are obtained solely based on the rankings of the publisher recommendation appraisal values.

In some embodiments, the appraisal values are based at least in part on third appraisal values. Before the weighting and summing of each appraisal value of each search phrase, the appraisal value calculating module 630 also uses a binary language model that separately calculates the score of each search phrase. In other words, the appraisal value calculating module 630 multiplies the probability that the first term in the search phrase will appear in all the published information with the probability that the first term will appear in all the published information when the second term appears in the search phrase to obtain a third appraisal value for each search phrase.

In some embodiments, the appraisal values are based at least in part on fourth appraisal values. Before the weighting and summing of each appraisal value of each search phrase, the appraisal value calculating module 630 also calculates the variation of quantity/frequency of each search phrase within a time interval to obtain a fourth appraisal value for each search phrase. The variation of quantity/frequency of the search phrase within the time interval is obtained by dividing the difference between the maximum and minimum values of the search phrase quantity/frequency in the time interval in all published information on websites and platforms by a length of the time interval.

In some embodiments, the appraisal values are based at least in part on fifth appraisal values. Before the weighting and summing of each appraisal value of each search term, the appraisal value calculating module 630 obtains fifth appraisal values of search phrases containing the subject terms based on the quality of the merchandise represented by the subject terms. Higher fifth appraisal values correspond to better quality merchandise.

In some embodiments, the appraisal values are based at least in part on sixth appraisal values. Before the weighting and summing of each appraisal value of each search phrase, the appraisal value calculating module 630 sets the sixth appraisal values of search phrases, with the sixth appraisal values whose subject term is new merchandise set higher than the sixth appraisal values of search phrases whose subject term is not new merchandise.

No restrictions exist as to the order in which each appraisal value is calculated, and in some embodiments, the appraisal values are calculated in parallel.

While publisher recommendation appraisal values are being calculated, the newly added third appraisal value, fourth appraisal value, fifth appraisal value, or sixth appraisal value are thereupon be selectively weighted and added to the first and second appraisal values to obtain the publisher recommendation appraisal value. In some embodiments, other appraisal values, as needed, are weighted and added together to the first and second appraisal values to obtain the publisher recommendation appraisal value.

In some embodiments, the system in the above embodiments updates recommended phrases periodically to keep up with the latest information trends.

Figure 7:
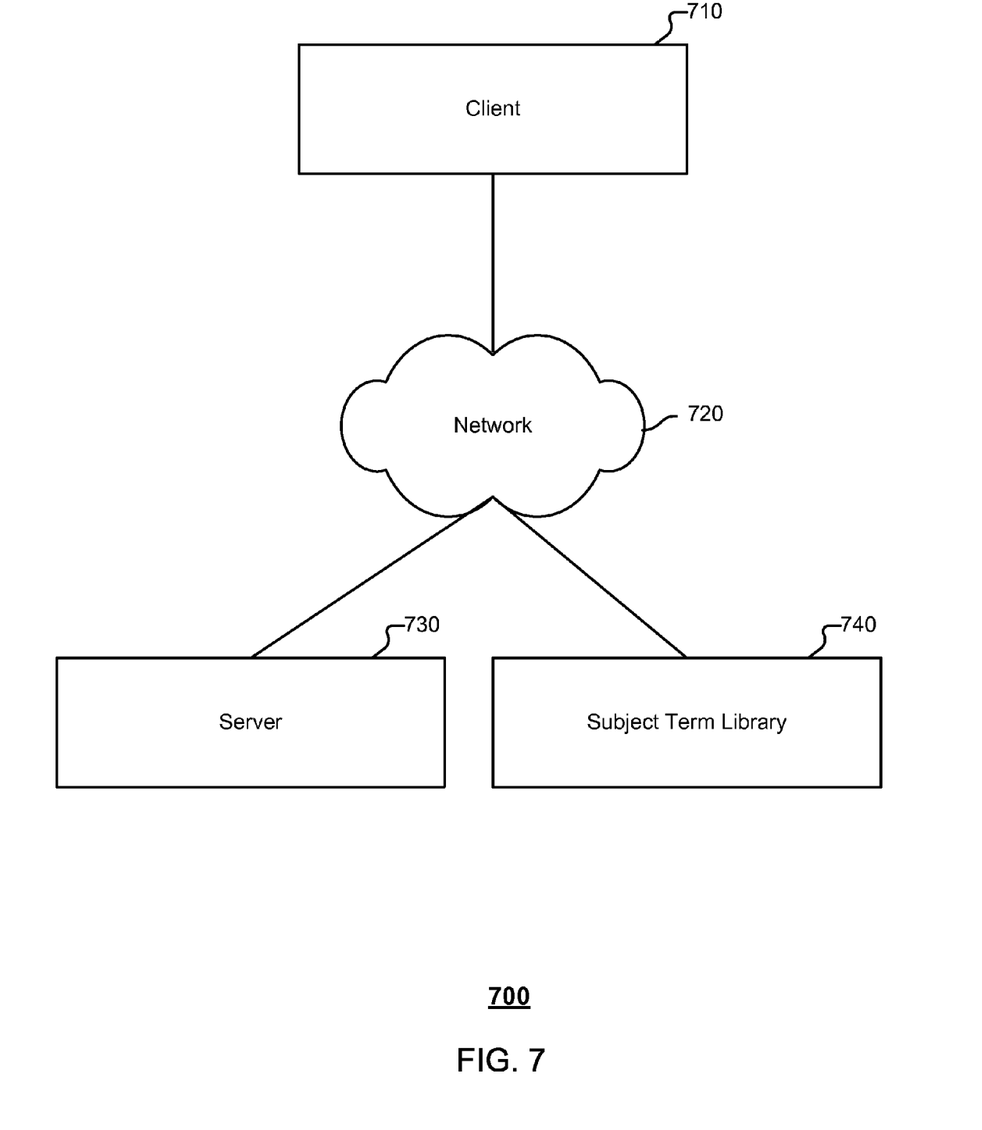
FIG. 7 of a diagram illustrating an embodiment of a system for recommending search phrases.

FIG. 7 of a diagram illustrating an embodiment of a system for recommending search phrases. The system 700 includes a server 730, a subject term library 740, and a client 710. The server 730 and the subject term library 740 are connected to the client 710 via a network 720.

For example, the client 710 enters content to be searched via the network 720 to the server 730 in the system 700.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or processing steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for recommending search phrases, comprising:
    obtaining one or more subject terms and one or more descriptive terms relating to the one or more subject terms from title information of information published by publishers;
    combining at least some of the one or more subject terms with at least some of the one or more descriptive terms to form a set of one or more search phrases;
    calculating a first appraisal value for a search phrase among the set of one or more search phrases, the calculating of the first appraisal value comprising multiplying term frequency of the search phrase with an inverse document frequency of the search phrase;
    determining a second appraisal value of the search phrase, the determining of the second appraisal value comprising:
        calculating an inverse class frequency of the search phrase within a designated category, wherein the inverse class frequency is regarded as the second appraisal value;
    calculating a third appraisal value of the search phrase, comprising:
        calculating a first probability that a first term appears in a search phrase associated with the published information;
        calculating a second probability that the first term appears jointly with a second term in the search phrase associated with the published information; and
        combining the first probability and the second probability to obtain the third appraisal value;
    combining at least the first appraisal value, the second appraisal value, and the third appraisal value of the search phrase to obtain a publisher recommendation appraisal value for the search phrase; and
    selecting a recommended phrase among the set of one or more search phrases based at least in part on a set of one or more corresponding publisher recommendation appraisal values for the set of one or more search phrases.

2. The method as described in claim 1, further comprising:
    obtaining the set of one or more search phrases associated with input terms based on user input terms; and
    ranking or filtering the set of one or more search phrases based on at least one publisher recommendation appraisal value.

3. The method as described in claim 1, further comprising:
    prior to combining at least the first appraisal value and the second appraisal value of the search phrase:
        calculating a variation of quantity or frequency of the search phrase within a time interval to obtain a fourth appraisal value for the search phrase, the calculating of the variations of the quantities or frequencies of the search phrases in the time interval comprising dividing a difference between the maximum and minimum values of the quantity or frequency of the search phrase in the time interval by a length of the time interval.

4. The method as described in claim 1, further comprising:
    prior to combining at least the first appraisal value and the second appraisal value of the search phrase, obtaining fifth appraisal values of search phrases containing the one or more subject terms based on quality of merchandise represented by the one or more subject terms, the fifth appraisal values being higher for merchandise having a higher quality.

5. The method as described in claim 1, further comprising:
    prior to combining at least the first appraisal value and the second appraisal value of the search phrase, setting sixth appraisal values of search phrases whose subject term is related to new merchandise, the sixth appraisal values being higher for search phrases whose subject term is related to new merchandise.

6. The method as described in claim 1, further comprising:
    acquiring one or more search phrases used by inquirers; and
    weighting and summing a number of times that inquirers have used each of the search phrases that were acquired, a number of results obtained when the search phrases were used, and a number of times that the inquirers clicked the obtained search results, to obtain an inquirer recommendation appraisal value for the search phrase, wherein the selecting of the recommended phrase among the one or more search phrases based on the publisher recommendation appraisal values comprises:
        normalizing the inquirer recommendation appraisal values and the publisher recommendation appraisal values of all the search phrases;
        adding the normalized inquirer recommendation appraisal values and the normalized publisher recommendation appraisal values of all the one or more search phrases to obtain total recommendation appraisal values;
        ranking the one or more search phrases in accordance with an order of total recommendation appraisal values from large to small; and
        selecting one of the following:
            selecting a predetermined quantity of search phrases ranked at the top as the recommended phrase; or
            regarding search phrases with recommendation appraisal values greater than or equal to a predetermined threshold value as the recommended phrase.

7. The method as described in claim 1, wherein the combining of the at least the first appraisal value and the second appraisal value of the search phrase includes weighting and summing at least the first appraisal value and the second appraisal value of the search phrase.

8. A system for recommending search phrases, comprising at least one processor configured to:
  obtain one or more subject terms and one or more descriptive terms relating to the one or more subject terms from title information of information published by publishers;
  combine at least some of the one or more subject terms with at least some of the one or more descriptive terms to form a set of one or more search phrases;
  calculate a first appraisal value for a search phrase among the set of one or more search phrases, the calculating of the first appraisal value comprising multiplying term frequency of the search phrase with an inverse document frequency of the search phrase;
  determine a second appraisal value of the search phrase, the determining of the second appraisal value comprising:
    calculate an inverse class frequency of the search phrase within a designated category, wherein the inverse class frequency is regarded as the second appraisal value;
  calculate a third appraisal value of the search phrase, comprising to:
    calculate a first probability that a first term associated with a search phrase that appears in the published information;
    calculate a second probability that the first term appears jointly with a second term in the search phrase associated with the published information; and
    combine the first probability and the second probability to obtain the third appraisal value;
  combine at least the first appraisal value, the second appraisal value, and the third appraisal value of the search phrase to obtain a publisher recommendation appraisal value for the search phrase; and
  select a recommended phrase among the set of one or more search phrases based at least in part on a set of one or more corresponding publisher recommendation appraisal values for the set of one or more search phrases; and
  a memory coupled to the at least one processor and configured to provide the at least one processor with instructions.

9. The system as described in claim 8, wherein the at least one processor further configured to:
  obtain the set of one or more search phrases associated with input terms based on user input terms; and
  rank or filter the set of one or more search phrases based on at least one publisher recommendation appraisal value.

10. The system as described in claim 8, wherein the at least one processor further configured to:
  prior to combining at least the first appraisal value and the second appraisal value of the search phrase:
    calculate a variation of quantity or frequency of the search phrase within a time interval to obtain a fourth appraisal value for the search phrase, the calculating of the variations of the quantities or frequencies of the search phrases in the time interval comprising divide a difference between the maximum and minimum values of the quantity or frequency of the search phrase in the time interval by a length of the time interval.

11. The system as described in claim 8, wherein the at least one processor further configured to:
  prior to combining at least the first appraisal value and the second appraisal value of the search phrase, obtain fifth appraisal values of search phrases containing the one or more subject terms based on quality of merchandise represented by the one or more subject terms, the fifth appraisal values being higher for merchandise having a higher quality.

12. The system as described in claim 8, wherein the at least one processor further configured to:
  prior to combining at least the first appraisal value and the second appraisal value of the search phrase, set sixth appraisal values of search phrases whose subject term is related to new merchandise, the sixth appraisal values being higher for search phrases whose subject term is related to new merchandise.

13. The system as described in claim 8, wherein the at least one processor further configured to:
  acquire one or more search phrases used by inquirers; and
  weight and sum a number of times that inquirers have used each of the search phrases that were acquired, a number of results obtained when the search phrases were used, and a number of times that the inquirers clicked the obtained search results, to obtain an inquirer recommendation appraisal value for the search phrase, wherein the selecting of the recommended phrase among the one or more search phrases based on the publisher recommendation appraisal values comprises:
    normalize the inquirer recommendation appraisal values and the publisher recommendation appraisal values of all the search phrases;
    add the normalized inquirer recommendation appraisal values and the normalized publisher recommendation appraisal values of all the one or more search phrases to obtain total recommendation appraisal values;
    rank the one or more search phrases in accordance with an order of total recommendation appraisal values from large to small; and
    select one of the following:
      select a predetermined quantity of search phrases ranked at the top as the recommended phrase; or
      regard search phrases with recommendation appraisal values greater than or equal to a predetermined threshold value as the recommended phrase.

14. The system as described in claim 8, wherein the combining of the at least the first appraisal value and the second appraisal value of the search phrase includes weight and sum at least the first appraisal value and the second appraisal value of the search phrase.

15. A computer program product for recommending search phrases, the computer program product being embodied in a tangible non-transitory computer readable storage medium and comprising computer instructions for:
  obtaining one or more subject terms and one or more descriptive terms relating to the one or more subject terms from title information of information published by publishers;
  combining at least some of the one or more subject terms with at least some of the one or more descriptive terms to form a set of one or more search phrases;

calculating a first appraisal value for a search phrase among the set of one or more search phrases, the calculating of the first appraisal value comprising multiplying term frequency of the search phrase with an inverse document frequency of the search phrase;

determining a second appraisal value of the search phrase, the determining of the second appraisal value comprising:

calculating an inverse class frequency of the search phrase within a designated category, wherein the inverse class frequency is regarded as the second appraisal value;

calculating a third appraisal value of the search phrase, comprising:

calculating a first probability that a first term associated with a search phrase that appears in the published information;

calculating a second probability that the first term appears jointly with a second term in the search phrase associated with the published information; and combining the first probability and the second probability to obtain the third appraisal value;

combining at least the first appraisal value, the second appraisal value, and the third appraisal value of the search phrase to obtain a publisher recommendation appraisal value for the search phrase; and selecting a recommended phrase among the set of one or more search phrases based at least in part on a set of one or more corresponding publisher recommendation appraisal values for the set of one or more search phrases.

16. The method as described in claim 1, wherein the search phrase includes a descriptive term, a subject term, or a combination thereof.

* * * * *